Sept. 5, 1944.  W. BAUSCH  2,357,377

OPTICAL INSTRUMENT SUPPORT

Filed March 17, 1943

WILLIAM BAUSCH
INVENTOR

BY *W. A. Ellestad*
*Herbert J. Schmid*
ATTORNEYS

Patented Sept. 5, 1944

2,357,377

UNITED STATES PATENT OFFICE 2,357,377

OPTICAL INSTRUMENT SUPPORT

William Bausch, Rochester, N. Y., assignor to Bausch & Lomb Optical Company, Rochester, N. Y., a corporation of New York Application March 17, 1943, Serial No. 479,472

7 Claims. (Cl. 88—36)

This invention relates to a support for optical instruments, such as binoculars and field glasses, to be held in operative position before the eyes of the user. The invention is particularly adapted for modern military use, wherein the user may place the binoculars or field glasses on the support and hold them in alignment with the eyes, thus relieving the nervous tension and strain placed upon the physical system of the user by prolonged holding of the weight of the field glasses or binoculars with the hands, which results in the inefficient performance of the duties of the user, for example, the arms of the user naturally become tired and unsteady and thus interfere with the clarity and accuracy of the user's vision.

In the past, it has been customary to provide a support for an optical instrument, such as field glasses or binoculars, wherein the supporting portion of the holder is located on the torso of the user. A support of this type interferes with the movement of the head of the user by confining the user to an aligned single position of the head and body, and in case of a demand for action, where it is necessary for the user to have free use of the natural movements of the head and body of the user, the interference of such support with the torso and clothing of the user hampers the performance of the act and becomes detrimental due to the effects resulting therefrom.

The invention is particularly adapted to overcome this difficulty had in prior devices. The device, representing the invention, allows the free and unrestrained movement of the head and body in any position that the user may assume in an active position. It is of paramount utility to the user in modern military maneuvers, where the active nature of combat duties requires the user to instantaneously change the positions of the head and body, with respect to each other, to meet sudden emergencies which may present themselves. As is well known, binoculars or field glasses are held by straps about the neck of the users and by dropping the hands from the support, the binoculars or field glasses will drop to the body, so that should occasion arise, the free use of the head and body may be instantly utilized.

Another advantage of the invention is that the performance of duties by the user may not entail rapid and instantaneous movement of the head and body but prolonged use of the binoculars or field glasses in a relatively inactive manner, such as scanning the horizon for vessels or aeroplanes, searching the skies overhead for aircraft, etc., and in this event, the invention is particularly useful. A support for binoculars or field glasses wherein the supporting position of the holder is located on the torso of the user is inefficient and lacks utility in cases of this kind. The reason for this premise is that usual observation stations on board ships, cockpits of aeroplanes, etc., have very limited quarters for the scrutinizer, and due to this fact, the change in movements of the body of the user is restrained, in which case the torso supporting member, fixedly secured to the binocular or field glass platform, allows the user to assume only one observation angle at a time in a forward position and, if the user desires to change to a new angle of observation, it is necessary that the body and the head be simultaneously turned in alignment with each other. It is of great importance that the user may be allowed to tip or turn his head (the body being usually confined to the same position) to assume any angle of observation that the user may desire or find necessary, without changing the position of the body, under the conditions given above. The invention allows free rotation of the head to assume any new angle of observation that the user deems desirable for viewing an objective, in contradistinction to devices of the torso supporting type which are incapable of giving this desirable result.

Still another advantage of the present invention is that the user may desire to temporarily dispense with the use of the support for the performance of duties in which the support is not required. To achieve this desirable end, in utilizing the invention, the user may allow the binoculars or field glasses to come to rest against his body, where they are held by their straps, and by raising the supporting platform and the attached lower support members, pivotally attached to the headgear, through an arcuate path, allow them to be positioned on top of the head and its embracing headgear. Due to the very high center of gravity about which these supporting members are pivotally rotatable, these members will be held in inoperative position, and the head and body may be used for any of their natural movements by the user, without interference by the support. This feature is very desirable in modern warfare, and also in civilian life, where the use of the binoculars or field glasses may be expeditiously and temporarily dispensed with for a period of time and be readily available when the use of the support is again desired. Devices of the torso supporting type are of little utility for achieving these desirable results, as the torso supporting member interferes with the free use of the head and body movements of the user when the field glass or binocular platform is swung to an inoperative position, and when the user desires to use his head and body for natural movements in new positions and to actively engage in duties requiring the free and unhampered use of these members of the body. As stated before, devices of the torso supporting type may only be efficiently used when the user assumes a fixed position of the head and body, i. e., the user must turn both the body and head in alignment with each other for assuming new positions and is restrained from movement of the head and body when these members may be inclined to each other. The invention is particularly adapted to solve this problem in the manner above stated.

Hence, my invention holds for its primary object the provision of a support for binoculars and field glasses, and the like, having means allowing the free and efficient use of the natural movements of the head and body members of the user in any position they may assume in relation to each other.

Another object of the invention is the provision for means for supporting the relatively heavy weight of the field glasses, binoculars, and the like, solely on the head of the user.

Still another object of the invention is to provide adjustable means in the component parts of the support itself whereby it may be readily fitted to the facial characteristics of the user.

A further object of the invention is to provide a support for binoculars, field glasses, and the like, which may be temporarily rendered inoperative and be readily available for use, without interfering with the natural movements of the head and body of the user.

A still further object of the invention is to provide an adjustable means for accommodating different sizes of field glasses or binoculars, so that one type or size may be substituted for the other in the holder.

These and other objects and advantages reside in certain novel features of construction, arrangement and combination of parts as will hereinafter be more fully set forth and pointed out in the appended claims.

Figure 1:
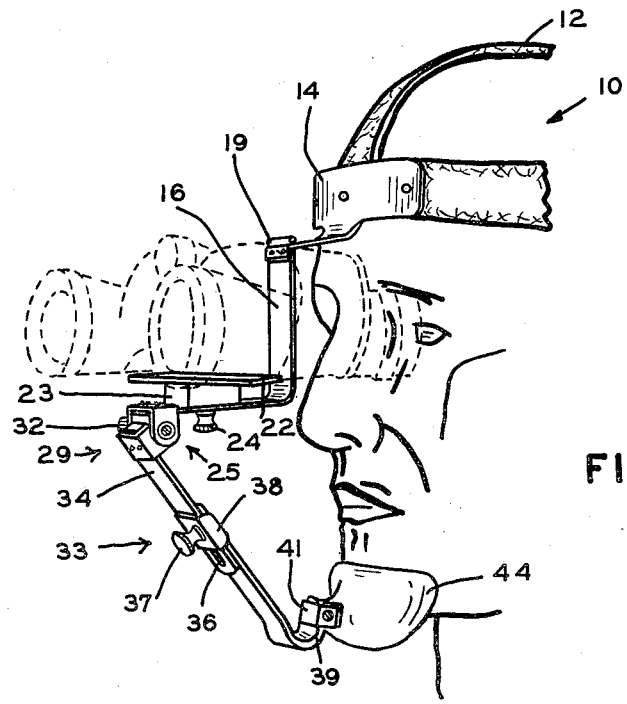
Fig. 1 is a perspective view of the field glass support embodying the principle of my invention and showing a pair of field glasses held in position thereon on the head of the wearer.
Figure 2:
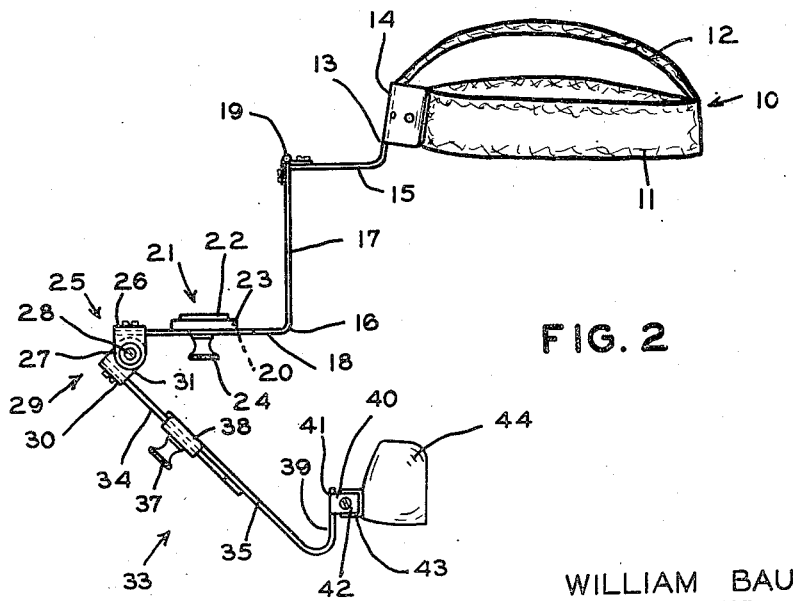
Fig. 2 is a side elevational view of the device shown in Fig. 1.

The structure illustrated in Figs. 1 and 2, inclusive, includes a headgear 10 comprising a horizontal strap 11 adapted to pass around the head of the user and a vertical strap 12 adapted to go over the top of the user's head. The headgear straps may take other forms to fit the sizes and contours of the head. Also, any well-known expedient for changing the length of the straps to securely hold the headgear in place on the head of the user may be used, such as buckle arrangements in which the straps may be severed and conveniently made adjustable to each other and secured against movement.

A bracket 13 comprising a plate 14 having a projecting member 15 is fastened to headgear strap 11 by means of rivets or other securing means.

An angular member 16, consisting of a vertical member or arm 17 and a horizontal member or arm 18, is pivotally attached to the bracket 13 by a hinge 19. The horizontal arm has a longitudinal opening 20 for a purpose which will later become apparent. The end portion of the bracket 13 abuts the side end portion of the vertical arm 17 through the connection formed by the leaves of the hinge 19, as shown in Fig. 2. This joinder of the parts allows the support to be swung outwardly from the face of the user and also prevents the support from contacting the face of the user by any rearward movement.

A field glass or binocular supporting platform 21, removably attached to the horizontal arm 18, comprises a field glass or binocular holding member 22, extending transversely of the horizontal arm 18; a block 23, disposed longitudinally of the horizontal arm 18 and fixedly secured to the member 22; and a thumb screw 24. The block 23 has a central threaded portion adapted to receive the thumb screw 24, after the latter has passed through the slot 20 of the arm 18. The platform, and binoculars or field glasses thereon, may be moved longitudinally on the arm 18 for adjustment of the binoculars or field glasses to the eyes of the user, thereby providing an adjustable platform for accommodating different sizes and types of field glasses or binoculars, so that one type and size may be readily substituted for another. If desired, the platform may be omitted and the horizontal arm 18 may take the form of a receptacle, having flared sides, for receiving the binoculars or field glasses.

A U-shaped member 25, having a central portion 26 and depending flanges 27, is secured to the end of the horizontal arm 18 by screws, as shown. Each of the depending flanges 27 has openings centrally located for receiving a pivot pin 28. A complementally U-shaped member 29, having a central portion 30 and flanges 31, is pivotally connected to the other member by the pin 28. The pin 28, extending through the flanges 27 and 31, has a threaded protruding portion (not shown) adapted to receive a thumb nut 32 for restraining the members 25 and 29 against movement, for a purpose later to be described.

A substantially vertical supporting member 33, having longitudinally aligned straps 34 and 35, is secured to the central portion 30 of the U-shaped member 29. The length of the vertical supporting member 33 comprising the straps 34 and 35 is made adjustable over a wide range by means of the structure best shown in Fig. 2. Thus, an elongated slot 36 is provided in the strap 34 and a threaded opening (not shown) is had in the strap 35. A thumb screw 37 passes through a flanged bearing plate 38, the slot 36 in the strap 34, and the threaded opening in the strap 35. The flanged bearing plate 38 acts to maintain the straps 34 and 35 in longitudinal alignment with each other and against lateral collapse.

At the end of the strap 35 there is an integral upturned portion 39 adapted to receive a U-shaped member 40. The member 40 has a central portion 41 secured to the upturned portion 39; and flanges 42, pivotally attached by a screw, to a block 43 integral with a chin receptacle 44.

The chin receptacle 44 has an opening therein for receiving the chin of the user.

Considering the structural arrangement of the invention in its entirety, it is readily apparent that the support structure, depending from the projecting portion of the bracket, can be readily adjusted, by manipulation of the elements 24, 32, and 37, to conform the support to the facial characteristics of the user so that the binoculars or field glasses will be supported in alignment with the eyes of the user and with their weight resting on the chin of the user. Also, the support is confined solely to the head of the wearer, allowing freedom of the head and body movements of the user in the performance of duties of observation. Furthermore, the support, due to its high center of gravity, when swung in an arcuate path to an inoperative position on top of the head of the user, will remain in a relatively fixed position until its use is again desired.

The support may be constructed of aluminum, plastic or other lightweight material, capable of being readily fabricated or molded, and having durability and strength in use. The headgear is preferably made of a textile fabric, or other material, having a sufficient flexibility so that it may be readily attached to the head of the user. The cup-shaped chin receptacle may be made of plastic or other moldable material.

From the foregoing, it will be apparent that I am able to attain the objects of my invention and provide a support for optical instruments, which permits freedom of the head and body movements of the user at all times. Various modifications of structure can be made without departing from the spirit of my invention or the scope of the appended claims.

I claim:

1. A device for supporting optical intruments such as field glasses and the like in operative position before the eyes, comprising a headgear; a member having one end pivotally attached to said headgear and terminating at the opposite end in a field glass supporting platform disposed in front of the eyes of the user, said member extending downwardly and outwardly adjacent the nose of the user; a chin engaging means; and means interconnecting the outer end of said platform and said chin engaging means for supporting the platform in front of the face of the user.

2. A device for supporting optical instruments such as field glasses and the like in operative position before the eyes, comprising a headgear; a member having one end attached to said headgear and terminating at the opposite end in a field glass supporting platform; chin engaging means; a rigid elongate member pivotally interconnecting the outer end of said platform and said chin engaging means for supporting the platform on the chin with the platform in front of the face of the user; and means for adjusting the length of said elongate member to accommodate users of different facial contours.

3. A device for supporting optical instruments such as field glasses and the like in operative position before the eyes, comprising a headgear; a member having one end attached to said headgear and terminating at the opposite end in a field glass supporting platform disposed in front of the eyes of the user, said member extending downwardly and outwardly adjacent the nose of the user; face engaging means for supporting the platform in front of the face of the user; and adjustable means for varying the distance between said platform and said face engaging means.

4. A device for supporting optical instruments such as field glasses and the like in operative position before the eyes, comprising a headgear; a member having one end attached to said headgear and terminating at its opposite end in a field glass supporting platform; a support member connected to said member and depending therefrom; face engaging means attached to said support member and adapted to support the platform in front of the face of the user; pivot means for adjusting said members to conform to the facial characteristics of the user; and means for locking said pivot means to secure said members in fixed position.

5. A device for supporting optical instruments such as field glasses and the like in operative position before the eyes, comprising a headgear; a member having one end attached to said headgear and terminating at the opposite end in a field glass supporting platform disposed in front of the eyes of the user; face engaging means for supporting the platform in front of the face of the user; and pivot means for allowing said platform supporting member and said face engaging means to be swung in an arcuate path above the head of the user.

6. A device for supporting optical instruments such as field glasses and the like in operative position before the eyes, comprising a headgear; a member pivotally attached to said headgear and extending downwardly and outwardly adjacent the nose of the user; a field glass supporting platform mounted on said member and movably adjustable thereon; chin engaging means; means pivotally interconnecting said platform and said chin engaging means for supporting the platform in front of the face of the user; and means for adjusting the length of said interconnecting means whereby the position of said platform can be maintained horizontal.

7. A device for supporting optical instruments such as field glasses and the like in operative position before the eyes, comprising a headgear; a member having one end attached to said headgear and terminating at the opposite end in an adjustable field glass supporting platform disposed in front of the eyes of the user; pivot means for adjusting said members to conform to the facial characteristics of the user; means for locking said pivot means to secure said members in fixed position; and a hinge member for pivotally allowing said platform supporting member and said face engaging means to be swung in an arcuate path above the head of the user.

WILLIAM BAUSCH.